(12) United States Patent
Burns et al.

(10) Patent No.: US 12,460,984 B2
(45) Date of Patent: Nov. 4, 2025

(54) ADJUSTABLE AIR QUALITY DETECTION SYSTEM

(71) Applicants: Michael J Burns, Oklahoma City, OK (US); Matthew N Brooks, Fort Worth, TX (US)

(72) Inventors: Michael J Burns, Oklahoma City, OK (US); Matthew N Brooks, Fort Worth, TX (US)

( * ) Notice: Subject to any disclaimer, the term of this patent is extended or adjusted under 35 U.S.C. 154(b) by 307 days.

(21) Appl. No.: 18/218,572

(22) Filed: Jul. 5, 2023

(65) Prior Publication Data
US 2025/0012656 A1   Jan. 9, 2025

(51) Int. Cl.
*G01M 3/04*   (2006.01)

(52) U.S. Cl.
CPC ..................... *G01M 3/04* (2013.01)

(58) Field of Classification Search
CPC .................. G01M 3/04; G01M 3/16
See application file for complete search history.

(56) References Cited

U.S. PATENT DOCUMENTS

| 10,962,437 B1 * | 3/2021 | Nottrott | G01N 21/3504 |
| 2016/0069162 A1 * | 3/2016 | Lynch | E21B 33/03 405/52 |
| 2018/0119544 A1 * | 5/2018 | Smith | G01N 33/0075 |

FOREIGN PATENT DOCUMENTS

| CN | 201460981 U | * | 5/2010 | |
| WO | WO-2023209351 A1 | * | 11/2023 | F23G 7/063 |

OTHER PUBLICATIONS

Machine translation of CN 201460981 (Year: 2014).*

* cited by examiner

Primary Examiner — Nathaniel J Kolb
(74) Attorney, Agent, or Firm — Edmond DeFrank

(57) ABSTRACT

The embodiments disclose an adjustable air quality detection system including at least one adjustable air quality enclosure with an exhaust valve configured to contain leaking gas from a wellhead within the enclosure, at least one air quality detector coupled to the exhaust valve having at least one gas sensor configured to detect properties of air quality from the wellhead passing through the exhaust valve, a gas flow meter coupled to the exhaust valve configured to measure the quantity over time, and flow rate over time of the exhausted gases detected; wherein the properties of air quality surrounding the wellhead include at least identification, quantity over time, and flow rate over time, in accordance with wellhead regulatory remediation emissions standards and a well leak detection app wirelessly coupled to the air quality detector configured to record and transmit the gas sensor detected properties data from the wellhead to a database.

15 Claims, 10 Drawing Sheets

ADJUSTABLE AIR QUALITY DETECTION SYSTEM

BACKGROUND

Greenhouse gases (GHGs) have become an issue of great interest. Some sources of GHGs are natural. Other sources may be caused by orphaned oil wells that are leaking GHGs, for example, methane and in other instances oil leaking from the orphaned oil well. The difficulty in dealing with these potential sources is identifying which are leaking and if so, how much are they leaking. Most could be mitigated; however, a cost-to-benefit determination must be made to justify the expense of the mitigation. A reliable cost-effective manner to make those cost-to-benefit determinations is needed.

DETAILED DESCRIPTION OF THE INVENTION

In a following description, reference is made to the accompanying drawings, which form a part hereof, and in which are shown by way of illustration a specific example in which the invention may be practiced. It is to be understood that other embodiments may be utilized and structural changes may be made without departing from the scope of the present invention.

General Overview

It should be noted that the descriptions that follow, for example, in terms of an adjustable gas leak detection system are described for illustrative purposes and the underlying system can apply to any number and multiple types of fluid detection projects. In one embodiment of the present invention, the well leakage analysis results 306 can be configured using waterproof materials. The well leakage analysis results 306 can be configured to include nonporous materials and can be configured to include air-sealed supports and sealing devices against the ground using the present invention.

The terms used herein "tent", "tenting", "enclosure", and "containment structure" is used interchangeably without any change in meaning. The terms used herein "impermeable", "nonporous", "air sealed", and "waterproof" are used interchangeably without any change in meaning.

Figure 1:
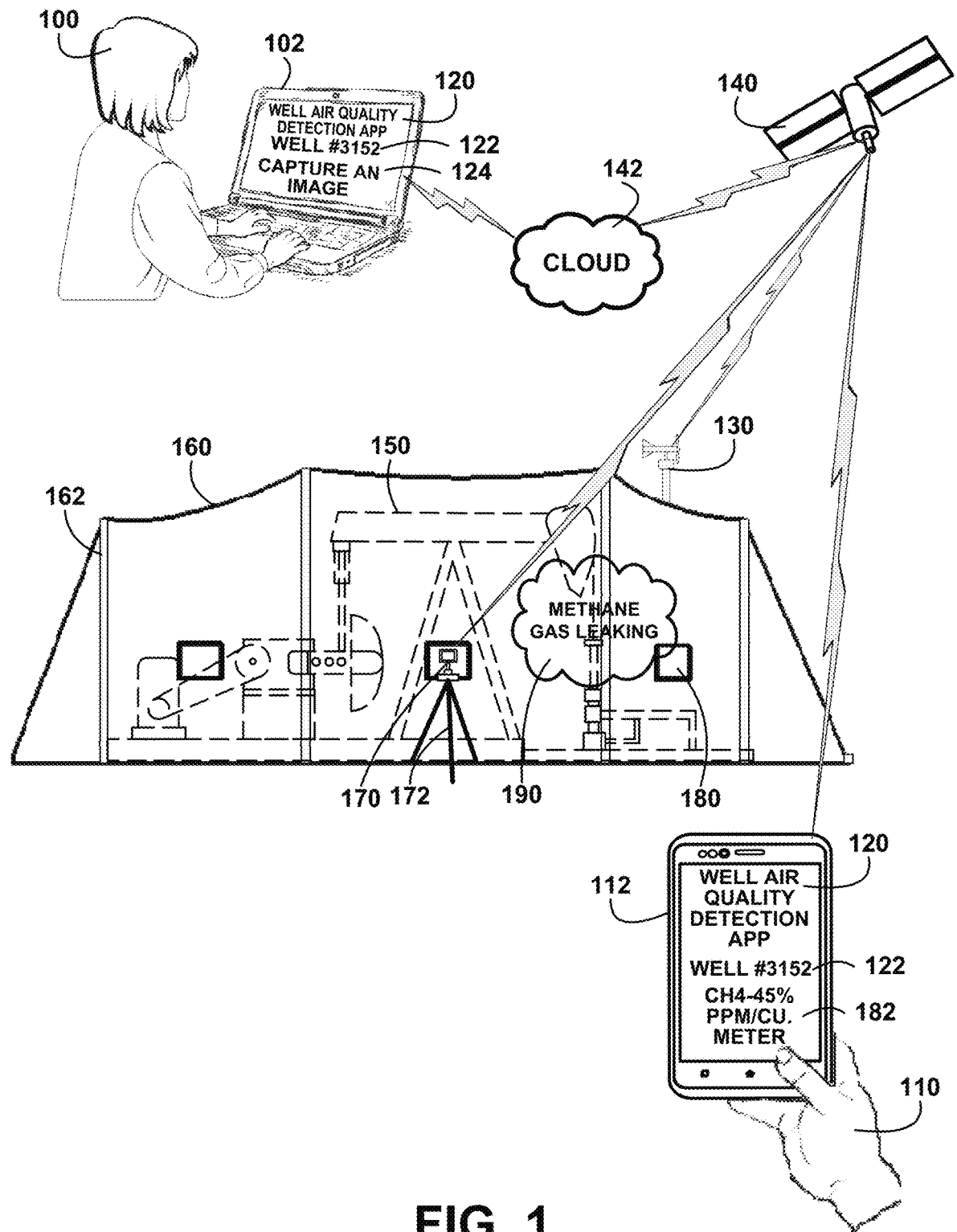
FIG. 1 shows for illustrative purposes only an example of an adjustable air quality detection system of one embodiment.

FIG. 1 shows for illustrative purposes only an example of an air quality detection enclosure of one embodiment. FIG. 1 shows a user 100 sitting at a user laptop computer 102 having a well air quality detection app 120 to remotely control an air quality detector 170. In this example, a gas detector can take readings through an enclosure window and has a built-in camera. The user 100, for example, is transmitting a command to capture an image 124 using the built-in camera of the air detector 170 mounted on a tripod 172. An air quality detection enclosure 160 installation includes a removable weather station 130 to measure wind speed, humidity, pressure, and precipitation. The weather station 130 automatically transmits its measurements to a satellite 140 to relay the measurements to the cloud 142. In this example, well #3152 122 is shown which is a well pump 150 covered with the air quality detection enclosure 160 to detect any leaking fluids, including a gas or a liquid.

The well air quality detection enclosure 160 of FIG. 1 is installed using a plurality of enclosure on-site telescopic pole supports 162 of FIG. 1 and anchoring members. The enclosure is secured with tent stakes at the bottom and sealed with native soil ramped away from the tent. The tops of the supporting poles are secured with cables, ropes, and ground stakes in multiple directions to counter winds and create a raised center ridge to run off rain and snow. A well pump is enclosed within an enclosure for capturing, for example, methane gas leaks for identification, measuring density, and quantification of volume.

In this example, the fluid can be a gas, as shown, with a detection of carbon dioxide having a density of CH4—45% ppm/cu·meter reading 182 for use in determining quantification results. The air quality detector 170 mounted on the tripod 172 projects the laser light through a window 180 to identify any gas and detect, in this instance, the density of the gas in parts per million per cubic meter.

The laser light passes through mixed air in the enclosure, for example, to detect any methane gas leaking 190. The methane gas molecules absorb a portion of the laser light. The absorption rate varies by specific gases and the results of the identification and density are transmitted to a user in the field 110 on the user's smartphone 112 having the well air quality detection app 120.

In one embodiment, an adjustable air quality detection system is used that includes at least one adjustable air quality enclosure configured to contain any leaking gas from an orphaned wellhead within the enclosure. At least one air quality detector having at least one gas sensor is configured to detect the properties of a gas leaking from the wellhead. The properties of a gas leaking from the wellhead include at least identification, quantity over time, and flow rate over time. A well leak detection app wirelessly coupled to at least one air quality detector is configured to record and transmit the gas sensor detected properties data from the wellhead to a database. At least one air quality detector is configured to include a camera and infrared camera to capture video and images of the wellhead leakage.

In another example, the adjustable air quality detection system includes a hydrocarbon sensor to detect leaking oil in a non-contact manner. The hydrocarbon sensor detects oil's natural fluorescence to detect the presence of oil. The hydrocarbon sensor records and transmits a detection signal transmitting the hydrocarbon sensor detected properties data from the wellhead to a database. The recording and transmission of fluid detections includes GPS coordinates of the well site location. The fluid detections of a gas or hydrocarbon confirm an orphaned wellhead that is leaking at a specific location. The user 100 sitting at a user's laptop computer 102 having a well air quality detection app 120 receives the leakage data and location. A field investigation is scheduled to evaluate the quantity and flow rate of the leak and additional identification of the fluid. The field evaluation is used to determine a remediation plan to stop the leak at the orphaned well and give an estimated cost to remediate and cap the wellhead leak. This developed information is used to identify both sources of monetizing the remediation plan project with, for example, carbon credits of one embodiment.

DETAILED DESCRIPTION

Figure 2:
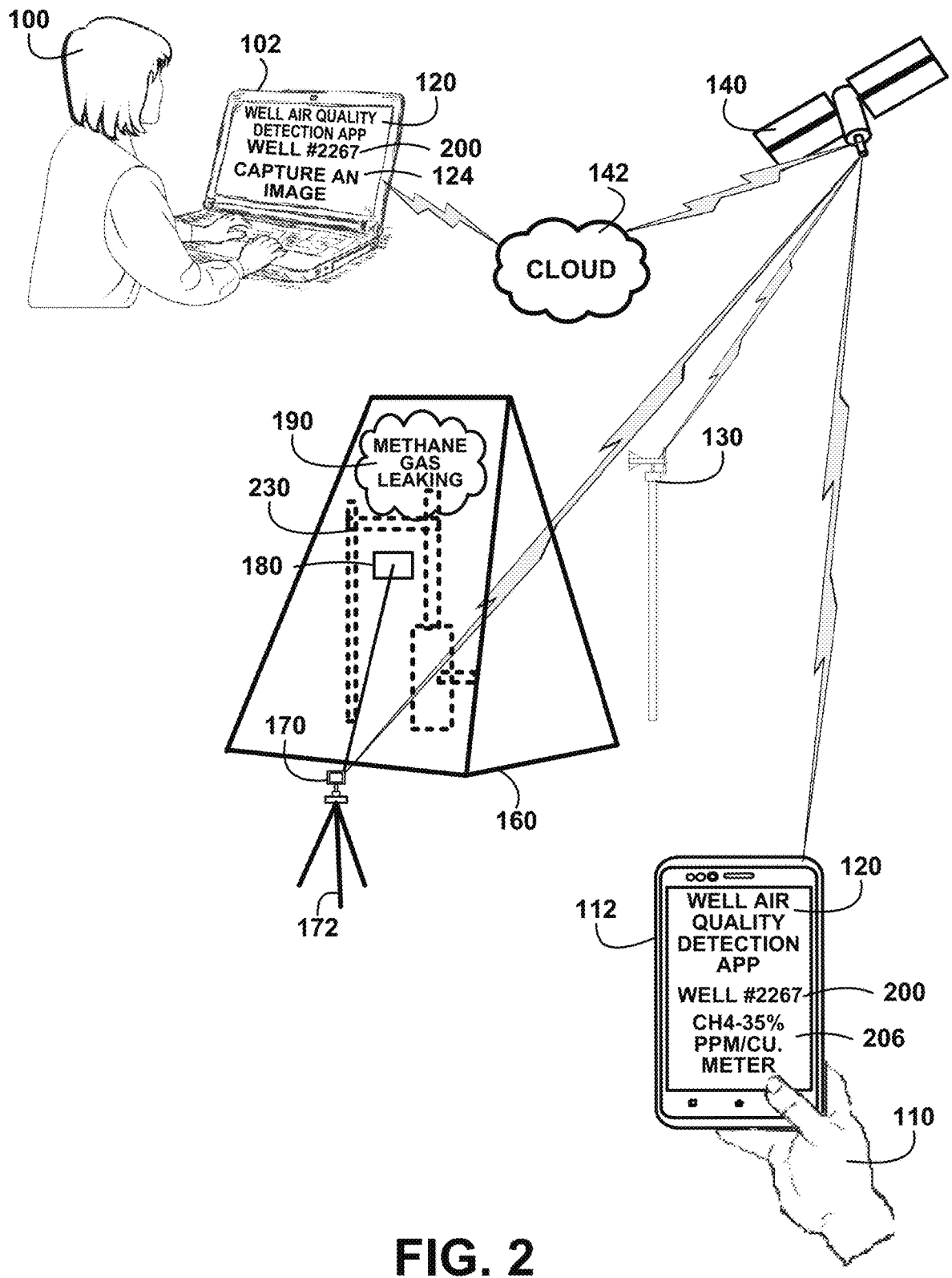
FIG. 2 shows for illustrative purposes only an example of a wellhead air quality detection enclosure of one embodiment.

FIG. 2 shows for illustrative purposes only an example of a wellhead gas leak detection enclosure of one embodiment. FIG. 2 shows the user 100 using the user laptop computer 102 having the well air quality detection app 120 to instruct the gas detector to capture an image 124 with the built-in camera of well #2267 200 within the gas leak detection enclosure 160. Well #2267 200 is a wellhead and the well air quality detection enclosure 160 is sized to fit the wellhead structure. The expanse and configuration of well pumps and wellheads can vary and the well air quality detection enclosure 160 is customizable to fit the particular structure of the well project.

The user laptop computer 102 transmits the instructions to the cloud 142 to relay to the satellite 140 and air quality detector 170. The weather station 130 transmits meteorological data to the satellite 140 for relay to the cloud 142 because wind and precipitation affect measurements. The well air quality detection enclosure 160 captures, for example, methane gas leaking 190 from the wellhead 230. The well air quality detection enclosure 160 is made with waterproof materials, including materials treated with a hydrophobic coating. The waterproofing prevents moisture, for example, rain and snow from entering the enclosure which can cause incorrect concentration measurements.

The well air quality detection enclosure 160 materials are also impermeable and include air-sealed telescoping support connections and sealing devices against the ground. The impermeable air-sealed construction prevents wind from causing excessive diffusion of the gas being detected and thereby causing errors in the concentration measurements. Proper sealing to the ground prevents wind from lifting the tent and possibly knocking it down. It further prevents excessive airflow through the tent causing excessive diffusion of the gas and creating incorrect concentration results.

The air quality detector 170 mounted on the tripod 172, in this example, projects a laser light through a window 180 of the gas leak detection enclosure 160. The air quality detector 170 transmits the gas detection data to the satellite 140 for relay to the cloud 142. The gas detection data is processed to determine a concentration level and the results in one example can be transmitted to a user smartphone 112 having the well air quality detection app 120. For example, the user in the field 110 may want to see the well #2267 200 detection results of CH4—35% ppm/cu·meter 206. The user in the field 110 may be in the area of well #2267 200 and want to check to make sure the well air quality detection enclosure 160 is properly sealed of one embodiment.

The well air quality detection enclosure 160 may also include additional wireless sensors including vision and imaging sensors, temperature sensors, pressure sensors, position sensors, particle sensors, motion sensors, leak sensors, humidity sensors, gas and chemical sensors, flow sensors, and other sensors that can detect any movement of the enclosure, and other related data to assure the integrity of the enclosure of one embodiment.

Figure 3:
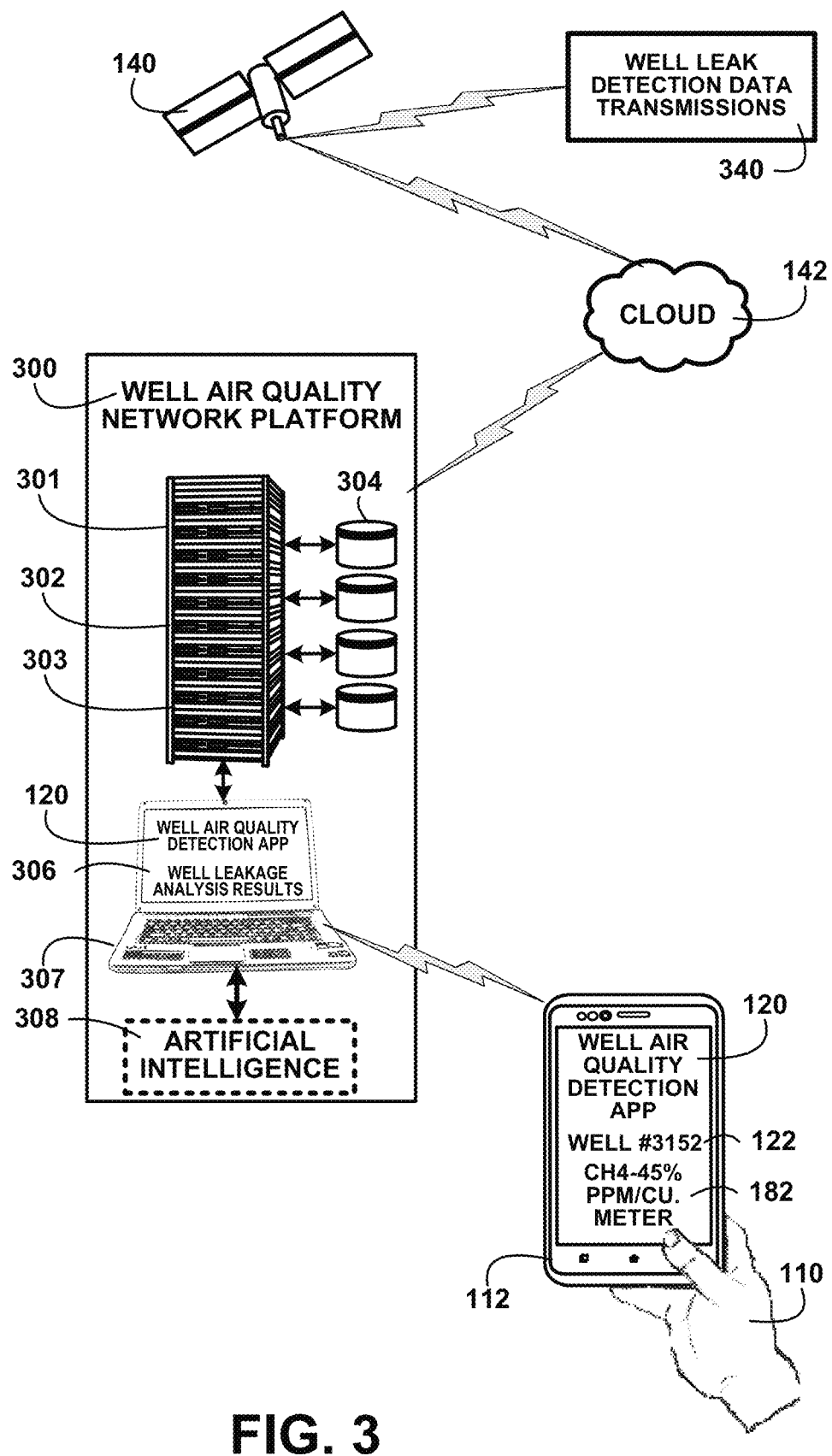
FIG. 3 shows for illustrative purposes only an example of a well air quality network platform of one embodiment.

A Well Air Quality Network Platform:

FIG. 3 shows for illustrative purposes only an example of a well air quality network platform of one embodiment. FIG. 3 shows well air quality data transmissions 340 transmitted to the satellite 140 and then relayed to the cloud 142. The well leak detection data transmissions 340 are then received in a well air quality network platform 300. The well air quality network platform 300 includes a plurality of digital servers 301, a plurality of processors 302, a plurality of analyzers 303, a plurality of databases 304, and a well air quality detection app 120 to transmit well leakage analysis results 306 with a platform computer 307. Gas leakage characteristics are analyzed using artificial intelligence 308 to predict potential increases in leakage rates. A user in the field 110 can review the displayed well leakage analysis results 306 on a user smartphone 112 having the well air quality detection app 120. In this example, well #3152 122 shows a methane leak reading of CH4—45% ppm/cu·meter 182.

A laser-based device coupled to at least one well air quality network platform processor determines the number of methane leaks within the effective tenting/leak source captures to approach full and accurate leak rates. The leak rates data is utilized for quantification of leaks, for example, at a wellhead for annual tonnage or equivalent readings in methane (CH4) or carbon dioxide equivalents (tCO2e) of one embodiment.

Figure 4:
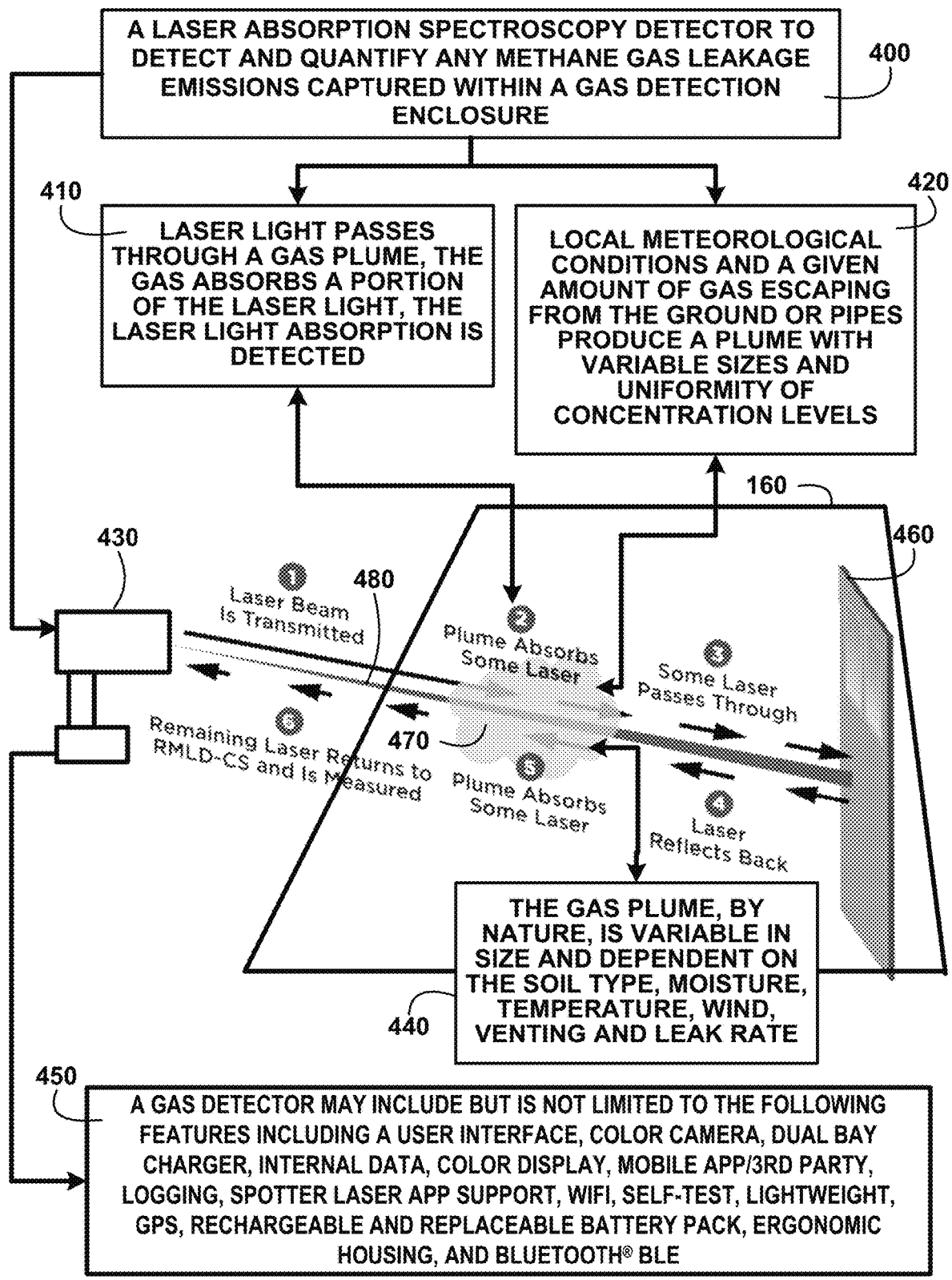
FIG. 4 shows for illustrative purposes only an example of a laser absorption spectroscopy gas detector of one embodiment.

A Laser Absorption Spectroscopy Gas Detector:

FIG. 4 shows for illustrative purposes only an example of a laser absorption spectroscopy gas detector of one embodiment. FIG. 4 shows a laser absorption spectroscopy detector to detect and quantify any methane gas leakage emissions captured within a gas detection enclosure 400. The laser light 480 passes through a gas plume, the gas absorbs a portion of the laser light, and the laser light absorption is detected 410. Local meteorological conditions and a given amount of gas escaping from the ground or pipes produce a plume with variable sizes and uniformity of concentration levels 420. A gas detector 430 can detect the specific gas 470 and the concentration of the gas in a given volume of air. The gas plume, by nature, is variable in size and dependent on the soil type, moisture, temperature, wind, venting, and leak rate 440.

A gas detector may include, but is not limited to, the following features including a user interface, color camera, dual bay charger, internal data, color display, mobile app/3rd party, logging, spotter laser app support, WIFI, self-test, lightweight, GPS, rechargeable and replaceable battery pack, ergonomic housing, and Bluetooth® Ble 450. The well air quality detection enclosure 160 is sized to accommodate the size and configuration of the wellhead framework 460 of one embodiment.

Figure 5A:
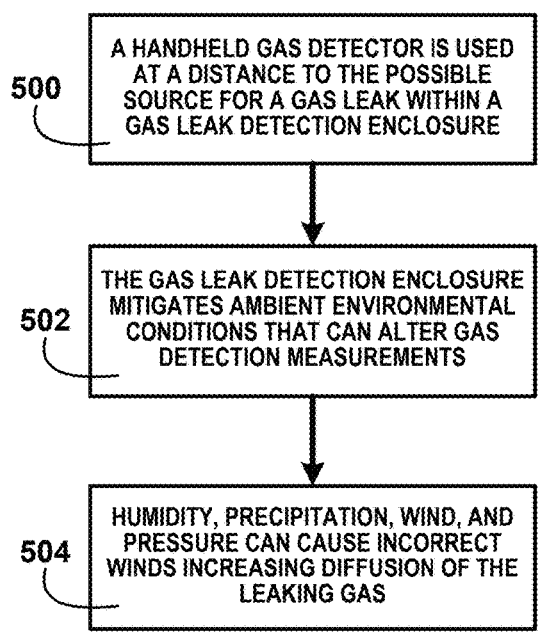
FIG. 5A shows a block diagram of an overview of the air quality detection enclosure impermeable environmental condition of one embodiment.

The Gas Leak Detection Enclosure Impermeable Environmental Condition:

FIG. 5A shows a block diagram of an overview of the gas leak detection enclosure impermeable environmental condition of one embodiment. FIG. 5A shows a handheld gas detector is used at a distance to the possible source for a gas leak within a gas leak detection enclosure 500. The gas leak detection enclosure mitigates ambient environmental conditions that can alter gas detection measurements 502. Humidity, precipitation, wind, and pressure can cause incorrect winds increasing diffusion of the leaking gas 504 of one embodiment.

Figure 5B:
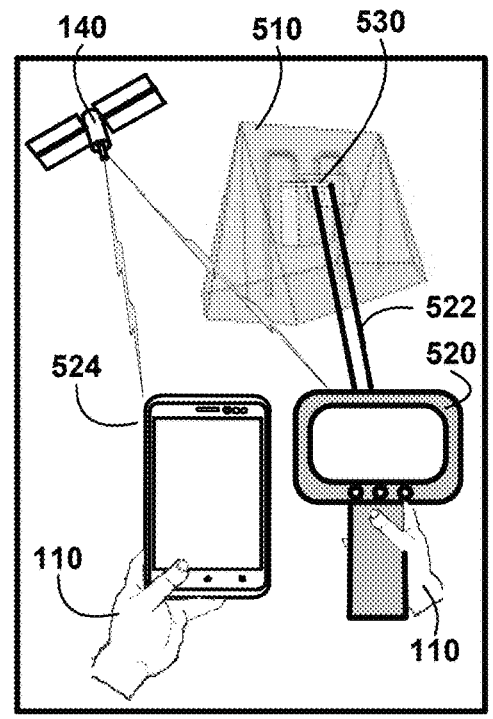
FIG. 5B shows for illustrative purposes only an example of a gas meter air quality detection enclosure of one embodiment.

A Gas Meter Gas Leak Detection Enclosure:

FIG. 5B shows for illustrative purposes only an example of a gas meter gas leak detection enclosure of one embodiment. FIG. 5B shows a gas meter gas leak detection enclosure 510 installed over a gas meter 530. In this example, a homeowner may have complained of a smell of gas in the backyard where the gas meter is located. The utility company may install a gas leak detection enclosure 510 surrounding the gas meter 530 to determine if a leak is occurring with the meter or connecting piping. The user in the field 110 may use a handheld gas detector 520 laser light 522 aimed through the window of the gas leak detection enclosure 510. The gas detector 520 data is transmitted to the satellite 140 and relayed through the cloud 142 of FIG. 1 for processing. The results can be transmitted back to the user in the field 110 on the user's mobile device 524, who can determine if the gas meter should be changed of one embodiment.

Figure 5C:
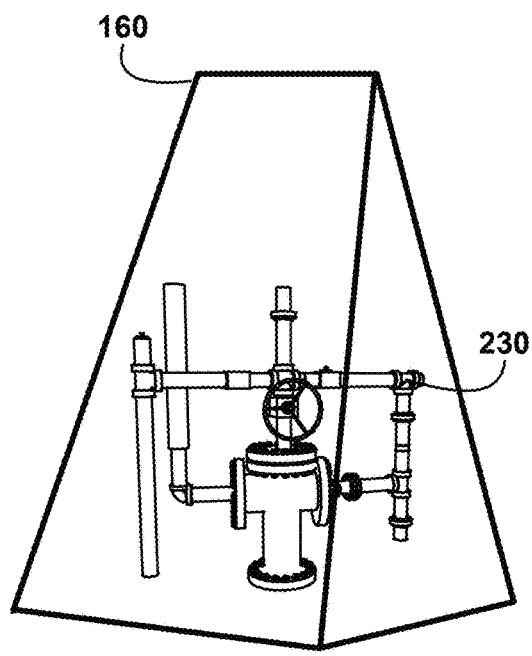
FIG. 5C shows for illustrative purposes only an example of a wellhead of one embodiment.

A Wellhead:

FIG. 5C shows for illustrative purposes only an example of a wellhead of one embodiment. FIG. 5C shows a wellhead 230 after being covered by a gas leak detection enclosure 160. The well air quality detection enclosure 160 is shown transparently for clarity in seeing the wellhead 230 of one embodiment.

Figure 5D:
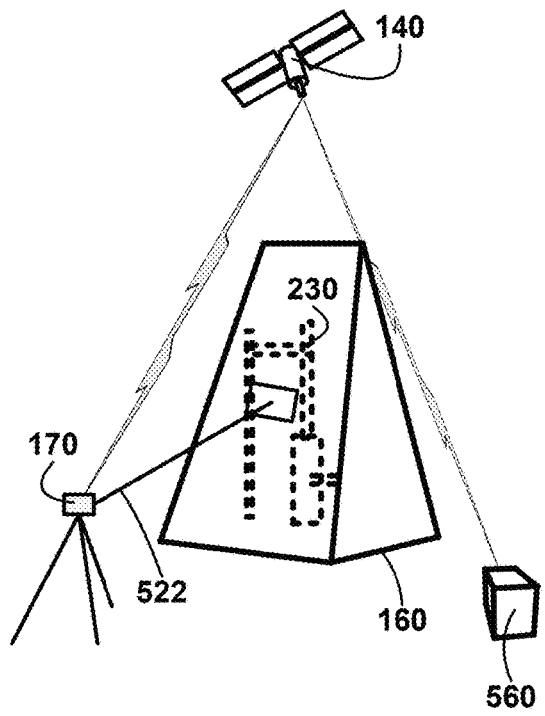
FIG. 5D shows for illustrative purposes only an example of a wellhead air quality detection enclosure of one embodiment.

A Wellhead Gas Detection Enclosure:

FIG. 5D shows for illustrative purposes only an example of a wellhead gas detection enclosure of one embodiment. FIG. 5D shows the wellhead 230 covered with the air quality detection enclosure 160. The air quality detector 170 projects the laser light 522 through the gas plume to collect data on the identity and concentration of the gas detected. The data is transmitted to the satellite 140 and relayed through the cloud 142 of FIG. 1 for processing. After the data is processed, a portable gas detector results device 560 is on-site to view a display of the processed results in the field at the wellhead site.

Figure 6:
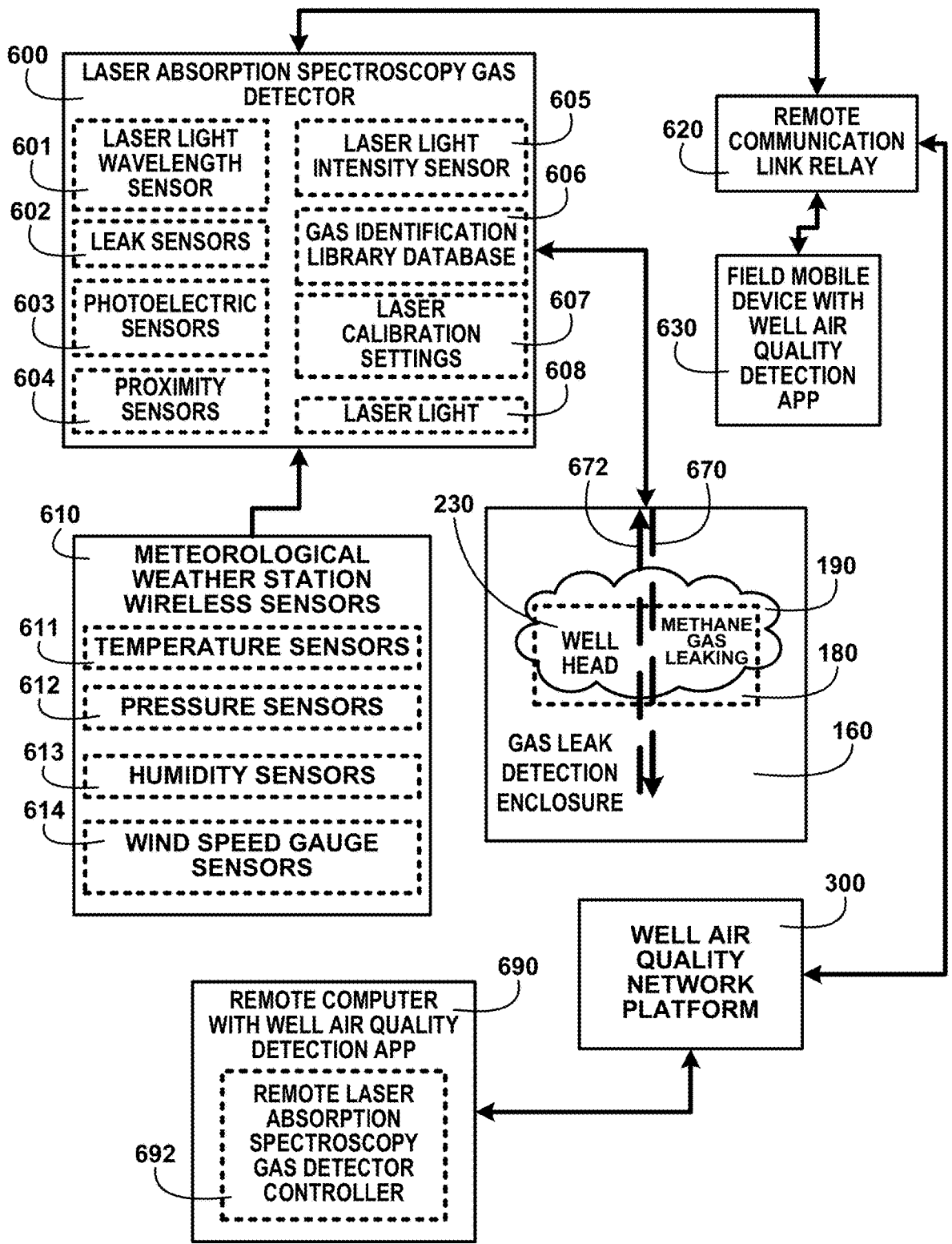
FIG. 6 shows a block diagram of an overview of a well air quality detection app of one embodiment.

Well Leak Detection App:

FIG. 6 shows a block diagram of an overview of a well leak detection app of one embodiment. FIG. 6 shows a laser absorption spectroscopy gas detector 600. The laser absorption spectroscopy gas detector 600 includes a laser light wavelength sensor 601, leak sensors 602, photoelectric sensors 603, proximity sensors 604, laser light intensity sensor 605, gas identification library database 606, laser calibration settings 607, laser light 608, meteorological weather station wireless sensors 610, temperature sensors 611, pressure sensors 612, humidity sensors 613, wind speed gauge sensors 614, remote communication link relay 620, and a field mobile device with the well air quality detection app 630. The well air quality detection enclosure 160 covers a wellhead 230. A gas detector projects a laser light outward 670 through a window 180 of the enclosure. The gas detector receives a reflected laser light 672 to measure the absorption of the gas detector laser light. The measured absorption through a plume of methane gas leaking 190 within the well air quality detection enclosure 160 also measures the density of the gas. A well air quality detection network platform 300 receives the gas detector-measured gas detection data. A remote computer with a well-leak detection app 690 processes the data and transmits the results to users. The computer-transmitted results also include instructions to a remote laser absorption spectroscopy gas detector controller 692 to adjust settings based on the results determined of one embodiment.

Figure 7A:
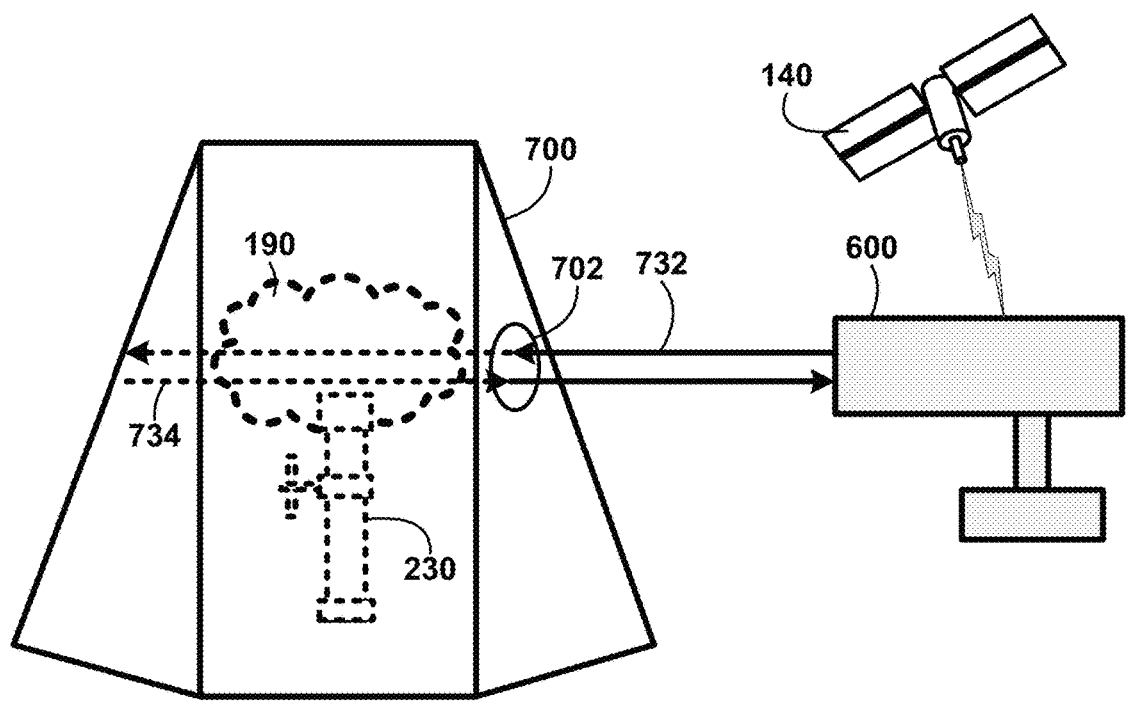
FIG. 7A shows for illustrative purposes only an example of wellhead air quality detection of one embodiment.

Wellhead Gas Leak Enclosure Detection:

FIG. 7A shows for illustrative purposes only an example of wellhead gas leak enclosure detection of one embodiment. FIG. 7A shows a wellhead gas leak detection enclosure 700 that has a sealed transparent porthole 702 used to visibly observe the surrounded wellhead 230. The wellhead gas leak detection enclosure 700 is capturing methane gas leaking 190. The concentration and leakage rate in terms of volume is detected with a laser light projection 732 and a laser light reflection 734 with a laser absorption spectroscopy gas detector 600. The gas concentration is determined by the amount of the laser light wavelength that is absorbed by the gas molecules. The detection and measurement data is transmitted to a satellite 140 from the wellhead site to be relayed to the cloud 142 of FIG. 1 for processing of one embodiment.

Figure 7B:
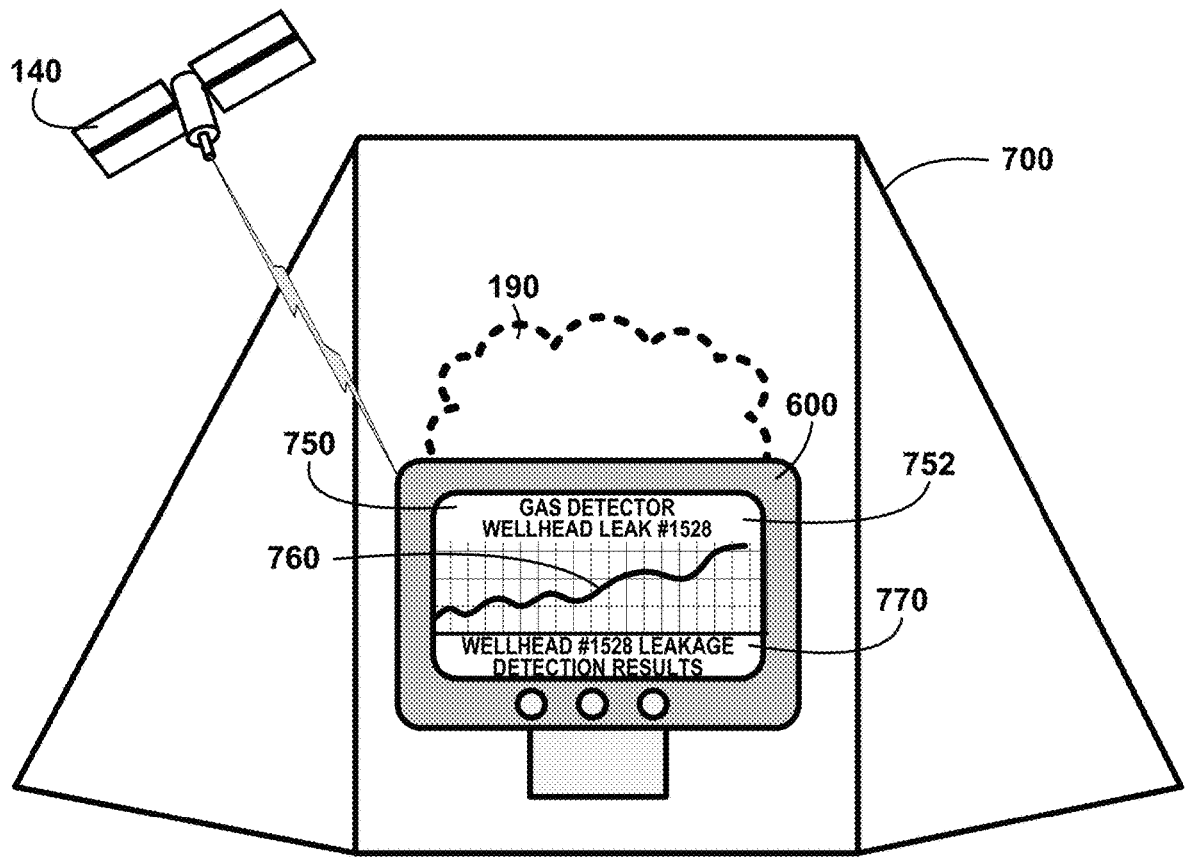
FIG. 7B shows for illustrative purposes only an example of wellhead leak detection results of one embodiment.

Wellhead Leak Detection Results:

FIG. 7B shows for illustrative purposes only an example of wellhead leak detection results of one embodiment. FIG. 7B shows the wellhead gas leak detection enclosure 700 and the display screen of the laser absorption spectroscopy gas detector 600. The laser-measured methane gas leaking 190 has been processed and the results are displayed on a laser absorption spectroscopy gas detector display screen 750. Shown on the display screen is the identification of the enclosure gas detector wellhead leak #1528 752 and leakage detection results 770. The graph shows the detected gas leakage concentration over time 760. In this example, the detected gas leakage concentration is rising periodically. The results can be seen from the satellite 140 by users in the field on their mobile devices having the well leak detection app of one embodiment.

Figure 8:
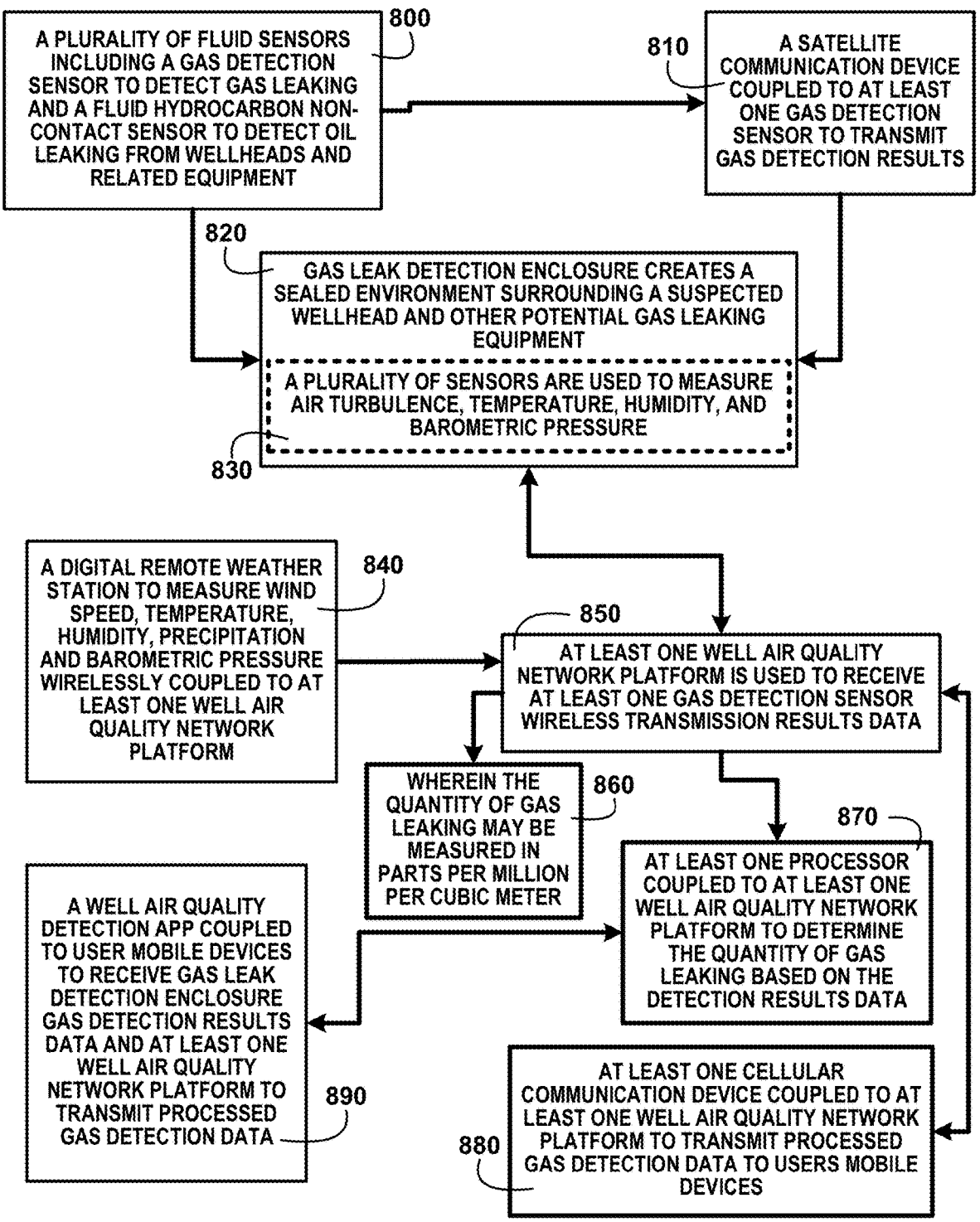
FIG. 8 shows a block diagram of an overview of air quality detection enclosure sensors of one embodiment.

Gas Leak Detection Enclosure Sensors:

FIG. 8 shows a block diagram of an overview of gas leak detection enclosure sensors of one embodiment. FIG. 8 shows a plurality of fluid sensors including a gas detection sensor to detect gas leaking and a fluid hydrocarbon non-contact sensor to detect oil leaking from wellheads and related equipment 800. A satellite communication device is coupled to at least one gas detection sensor to transmit gas detection results 810. Gas leak detection enclosure creates a sealed environment surrounding a suspected wellhead and other potential gas-leaking equipment 820. A plurality of sensors is used to measure air turbulence, temperature, humidity, and barometric pressure 830. A digital remote weather station is used to measure wind speed, temperature, humidity, precipitation and barometric pressure wirelessly coupled to at least one well air quality network platform 840.

At least one well air quality network platform is used to receive at least one gas detection sensor wireless transmission results data 850. Wherein the quantity of gas leaking may be measured in parts per million per cubic meter 860. At least one processor is coupled to at least one well air quality network platform to determine the quantity of gas leaking based on the detection results data 870. At least one cellular communication device is coupled to at least one well air quality network platform to transmit processed gas detection data to the user's mobile devices 880. A well air quality detection app is coupled to a user's mobile device to receive gas leak detection enclosure gas detection results data and at least one well air quality network platform to transmit processed gas detection data 890 of one embodiment.

Figure 9:
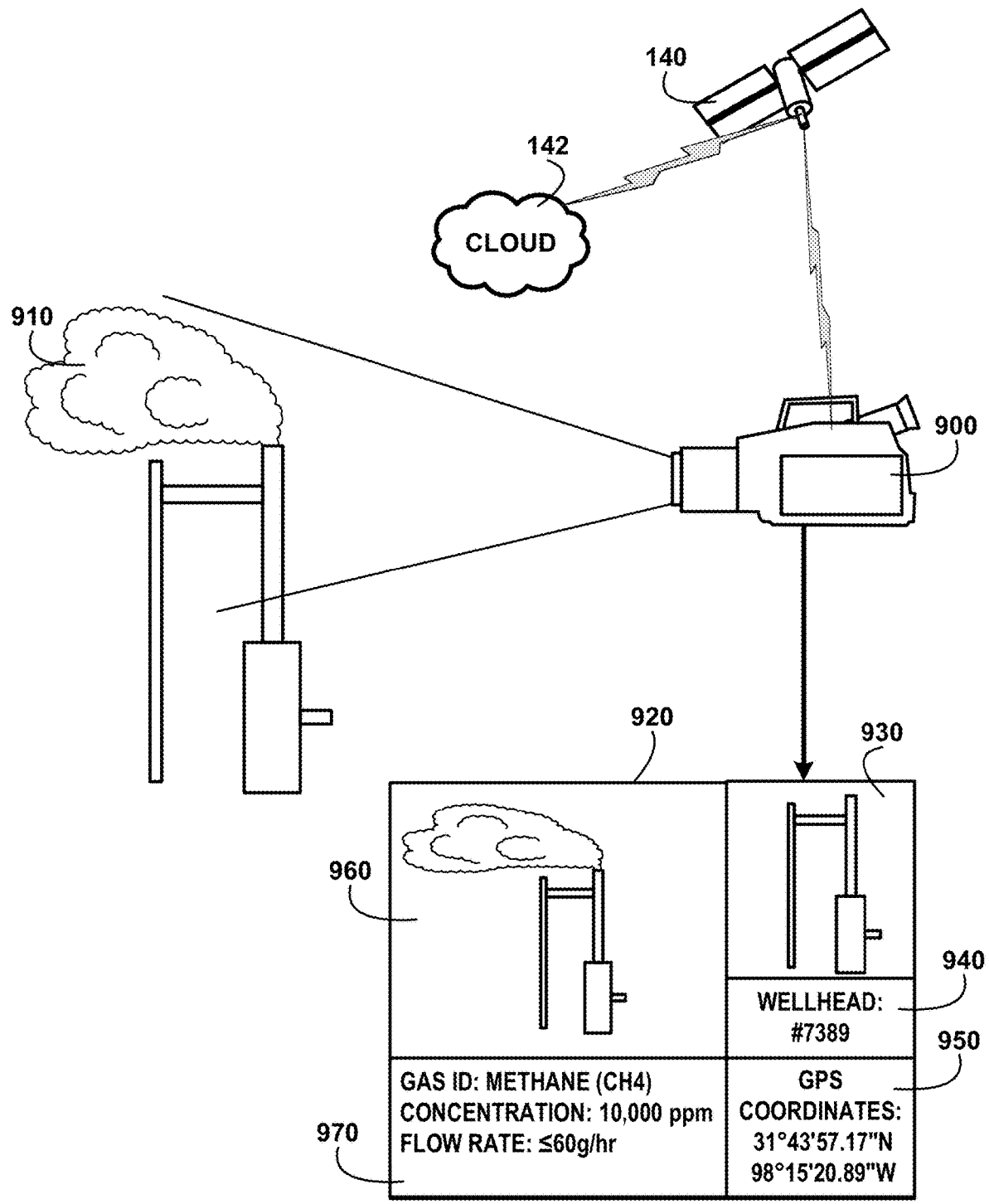
FIG. 9 shows for illustrative purposes only an example of a preliminary air quality detection leak survey of one embodiment.

Preliminary Gas Detection Camera Leak Survey:

FIG. 9 shows for illustrative purposes only an example of a preliminary gas detection camera leak survey of one embodiment. FIG. 9 shows a gas detection camera 900 is used in a preliminary gas detection camera leak survey before erecting the adjustable gas leak enclosure to determine whether a leak exists and the approximate dimensions for the adjustable gas leak enclosure. FIG. 9 shows a portable gas detection camera used for detecting invisible gas plume emissions 910.

In one embodiment, the gas detection camera uses a thermal mapping comparison with the surroundings to detect a thermal differentiation between the surroundings and a gas leak plume. A leaking gas has a predetermined temperature and an infrared camera system is used to determine the temperature and match the determined temperature against various gases to make a preliminary determination of the gas identification. In one embodiment, optical gas imaging uses a spectrally filtered thermal camera to visualize otherwise invisible gas leaks. It works by measuring the infrared radiation passing through a volume of gas. The method of quantification is image-based and embedded within the camera, making it possible to estimate emission amounts in high places, inaccessible hazardous areas, and even indoor areas. The method of determining a flow rate is made by calculating the amount of gas and the transit time across a predetermined distance to calculate the flow velocity of the gas and determine an estimated flow rate of the gas leak.

The gas detection camera detected gas preliminary images and gas properties 920 are stored for future comparisons to determine the stability of the leakage and any subsequent changes. Gas detection camera 900 imaging is made from different positions around the gas wellhead 930 to determine the extent of the structure. The different positions around the gas wellhead 930 are used to make multiple calculations of the concentration and gas properties. For example, the clarity of background images assists in determining the concentration of the gas. The images are labeled with the wellhead identification number 940. A gas wellhead registered GPS coordinates 950 are confirmed with a GPS reading device in the gas detection camera 900.

The gas detection camera 900 images of the gas plume including thermal coloring 960. Preliminary detected gas properties 970 are calculated with an onboard camera processor. The preliminary detected gas properties 970 and images are transmitted to satellite communication 140 from the wellhead site. The transmitted data is relayed from the satellite 140 to be recorded on the cloud 142 for further processing and to add to historical records for the specific gas wellhead 930 of one embodiment.

Figure 10:
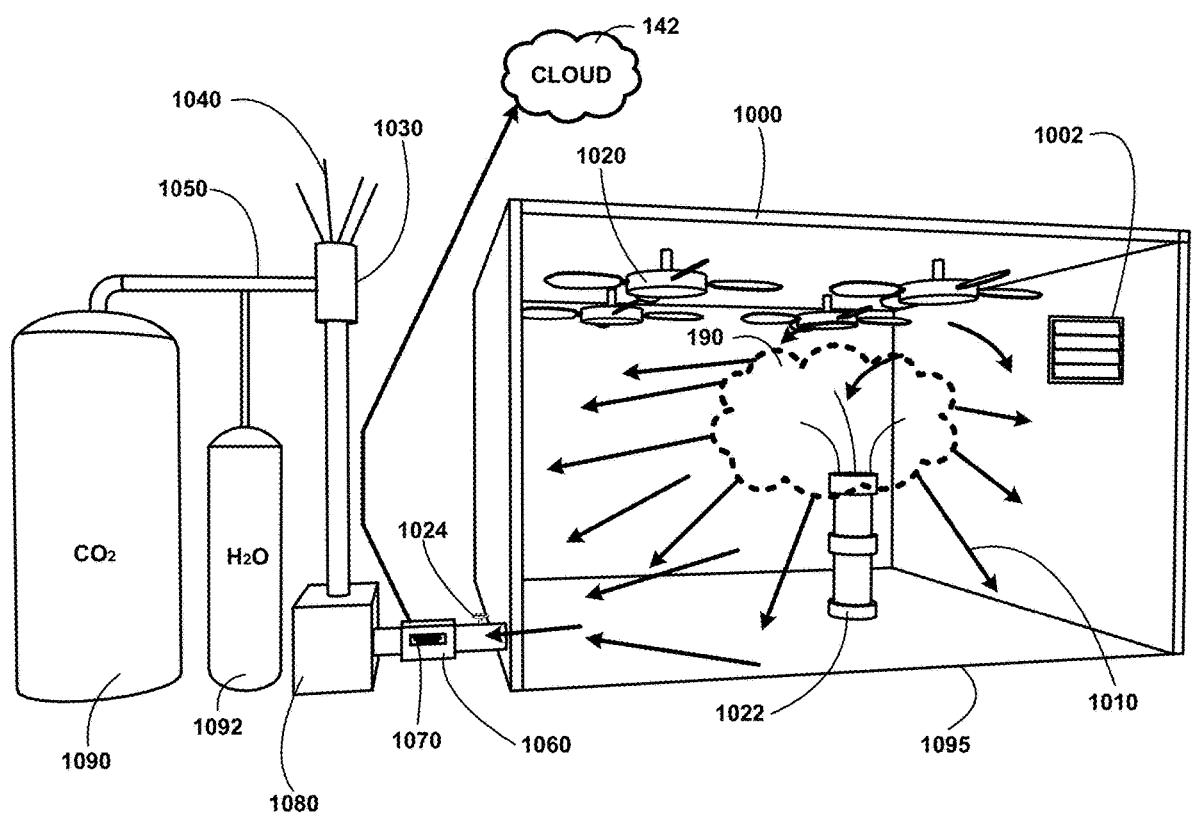
FIG. 10 shows for illustrative purposes only an example of rigid weatherproof gas destruction and $CO_2$ storage wellhead system of one embodiment.

Rigid Weatherproof Gas Destruction and $CO_2$ Storage Wellhead System:

FIG. 10 shows for illustrative purposes only an example of rigid weatherproof gas destruction and $CO_2$ storage wellhead system of one embodiment. FIG. 10 shows in another embodiment, rigid exterior weatherproof panels 1000 forming the well air quality detection enclosure 160 of FIG. 1. A front wall for illustration visibility 1095 (not shown) allows an interior view of the rigid exterior weatherproof panel well air quality detection enclosure 160 of FIG. 1. At least one ambient air inlet 1002 is coupled through at least one of the rigid exterior weatherproof panels 1000.

FIG. 10 shows a leaking gas wellhead 1022 with a plume of methane gas leaking 190. A plurality of air mixing fans 1020 move air within the rigid exterior weatherproof panels 1000 to stabilize and equally distribute the gas emissions and ambient air mixture 1010. An exhaust valve 1024 conveys the gas emissions and ambient air mixture to a gas flow meter 1070 having a plurality of sensors 1060. The gas flow meter 1070 quantifies the rate of flow of the gas emissions and ambient air mixture. The sensor identification of the gas and gas flow meter data is used to develop a remediation plan in accordance with wellhead regulatory emissions remediation carbon credit standards and practices (non-government and government bodies), that can be based on the wellhead location.

The plurality of sensors 1060 includes sensors to identify gas(es) in the flow. The rate of flow is recorded in a memory device (not shown) in the gas flow meter 1070. The recorded rate of flow is transmitted to the cloud 142 and relayed to the well air quality network platform 300 of FIG. 3.

The gas emissions and ambient air mixture pass to a high flow chamber 1080 for preparation for the destruction of, for example, methane gas. In this example, the methane gas and ambient air mixture are ignited using an electrical spark igniter coupled to a gas combustion chamber 1030. The heat is dissipated to the atmosphere as combustion heat exhaust 1040. The heat is passed through a heat exchanger using a fan to draw the heat to the outside atmosphere.

The residual carbon dioxide ($CO_2$) from the combustion is compressed and conveyed through $CO_2$ collection piping 1050 to a $CO_2$ collection tank 1090. Digital sensors measure the pressure (psi) of the predetermined volume of the $CO_2$ collection tank 1090. The $CO_2$ collection tank 1090 volume at a measured psi is processed to determine the volume of the $CO_2$. The volume of the $CO_2$ combustion residual is used to calculate the volume of the methane ($CH_4$) gas combusted.

The production of $CO_2$ from the combustion of methane and other greenhouse gases are known ratios and the quantification of the carbon dioxide is in direct relationship to the volume and density of the combustible gas. Methane ($CH_4$) combustion produces $CO_2$ and $H_2O$ and the water is collected in an $H_2O$ tank 1092. Periodically the contents of each tank are collected for processing to avoid release of the $CO_2$ and application of the water, for example, for agricultural use of one embodiment.

The foregoing has described the principles, embodiments, and modes of operation of the present invention. However, the invention should not be construed as being limited to the particular embodiments discussed. The above-described embodiments should be regarded as illustrative rather than restrictive, and it should be appreciated that variations may be made in those embodiments by workers skilled in the art without departing from the scope of the present invention as defined by the following claims.

What is claimed is:

1. An adjustable air quality detection system, comprising:
   at least one adjustable air quality enclosure with an exhaust valve configured to contain leaking gas from a wellhead within the enclosure;
   at least one air quality detector coupled to the exhaust valve having at least one gas sensor configured to detect properties of air quality from the wellhead passing through the exhaust valve;
a gas flow meter coupled to the exhaust valve configured to measure the quantity over time, and flow rate over time of the exhausted gases detected;
a plurality of air quality enclosure on-site telescopic pole support and anchoring members;
wherein the properties of air quality surrounding the wellhead include at least identification, quantity over time, and flow rate over time; and
a well leak detection app wirelessly coupled to the at least one air quality detector configured to record and transmit the gas sensor detected properties data from the wellhead to a database.

2. The adjustable air quality detection system of claim 1, further comprising a weather station to monitor and collect meteorological data of conditions at the wellhead affecting gas sensor measurements.

3. The adjustable air quality detection system of claim 1, wherein the at least one air quality detector includes a laser absorption spectroscopy detector to detect and quantify methane gas leakage emissions captured within an air quality detection enclosure.

4. The adjustable air quality detection system of claim 1, wherein the communication device includes satellite, cellular, and WIFI capability.

5. The adjustable air quality detection system of claim 1, further comprising a digital cloud wirelessly coupled to the well leak detection app configured to receive gas sensor detection and gas flow meter measurement data and process the gas sensor detection and exhaust valve gas flow meter measurement data using at least one digital processor.

6. An adjustable air quality detection system, comprising:
at least one adjustable air quality enclosure with an exhaust valve configured to contain leaking gas from a wellhead within the air quality enclosure, wherein the at least one adjustable air quality detection enclosure is configured to include adjustable height telescopic pole supports to cover varying heights of wellheads;
at least one air quality detector coupled to the exhaust valve having at least one gas sensor configured to detect properties of air quality surrounding the wellhead passing through the exhaust valve;
a gas flow meter coupled to the exhaust valve configured to measure the quantity over time, and flow rate over time of the exhausted gases detected;
wherein the properties of air quality surrounding the wellhead include at least identification, quantity over time, and flow rate over time;
a well leak detection app wirelessly coupled to the at least one air quality detector configured to record and transmit the gas sensor detected properties data from the wellhead to a database; and
a communication device having satellite, cellular, and WIFI capability coupled to the well leak detection app configured to receive control settings for the at least one air quality detector.

7. The adjustable air quality detection system of claim 6, wherein the at least one adjustable air quality detection enclosure is configured to include adjustable length and width dimensions to contain varying wellhead structures.

8. The adjustable air quality detection system of claim 6, wherein the at least one adjustable air quality detection enclosure is configured to be made of waterproof nonporous materials to reduce external meteorological conditions effects on sensor measurements.

9. The adjustable air quality detection system of claim 6, wherein the at least one adjustable air quality detection enclosure includes a plurality of air quality enclosure on-site support and anchoring members to create a nonporous containment structure.

10. The adjustable air quality detection system of claim 6, wherein the communication device includes satellite, cellular, and WIFI capability to relay gas sensor gas detection and gas flow meter measurement data from the wellhead locations to a monitoring station database.

11. An adjustable air quality detection system, comprising:
at least one adjustable air quality enclosure with an exhaust valve configured to contain air surrounding a wellhead within the air quality enclosure, wherein the at least one adjustable air quality detection enclosure is configured to include adjustable height telescopic poles support to cover varying heights of wellheads and to include adjustable length and width dimensions to contain varying wellhead structures;
at least one air quality detector coupled to the exhaust valve having at least one gas sensor configured to detect properties of air quality surrounding the wellhead passing through the exhaust valve;
a gas flow meter coupled to the exhaust valve configured to measure the quantity over time, and flow rate over time of the exhausted gases detected;
wherein the properties of air quality surrounding the wellhead include at least identification, quantity over time, and flow rate over time;
a well leak detection app wirelessly coupled to the at least one air quality detector configured to record and transmit the gas sensor detected properties and exhaust valve gas flow meter measurement data from the wellhead to a database;
a communication device having satellite, cellular, and WIFI capability coupled to the well leak detection app configured to receive control settings for the at least one air quality detector; and
wherein the at least one air quality detector is configured to include a camera and infrared camera to capture video and images of the wellhead leakage.

12. The adjustable air quality detection system of claim 11, further comprising a digital cloud wirelessly coupled to the well leak detection app configured to receive gas sensor detection and gas flow meter measurement data and process the gas sensor detection and gas flow meter measurement data using at least one digital processor.

13. The adjustable air quality detection system of claim 11, wherein the at least one air quality detector includes a laser absorption spectroscopy detector to detect and quantify wellhead methane gas leakage emissions captured within an air quality detection enclosure.

14. The adjustable air quality detection system of claim 11, further comprising a plurality of fluid sensors including gas and hydrocarbon sensors configured within the at least one adjustable air quality detection enclosure to identify, quantify over time, and measure a flow rate over time of wellhead fluid leaks passing through the exhaust valve including methane gas leakage emissions captured within an air quality detection enclosure and oil leakage.

15. The adjustable air quality detection system of claim 11, wherein the at least one adjustable air quality detection enclosure is configured to be made of waterproof nonporous materials to reduce external meteorological conditions effects on sensor measurements.

\* \* \* \* \*